(12) United States Patent
Wollman

(10) Patent No.: US 12,108,735 B2
(45) Date of Patent: Oct. 8, 2024

(54) MANURE SCRAPING ASSEMBLY

(71) Applicant: Michael Wollman, Sioux Falls, SD (US)

(72) Inventor: Michael Wollman, Sioux Falls, SD (US)

( * ) Notice: Subject to any disclaimer, the term of this patent is extended or adjusted under 35 U.S.C. 154(b) by 726 days.

(21) Appl. No.: 17/241,453

(22) Filed: Apr. 27, 2021

(65) Prior Publication Data

US 2022/0338439 A1    Oct. 27, 2022

(51) Int. Cl.
*A01K 1/01* (2006.01)
*B08B 1/16* (2024.01)

(52) U.S. Cl.
CPC ................. *A01K 1/01* (2013.01); *B08B 1/165* (2024.01)

(58) Field of Classification Search
CPC .................................. A01K 1/01; B08B 1/165
See application file for complete search history.

(56) References Cited

U.S. PATENT DOCUMENTS

| | | | |
|---|---|---|---|
| 3,727,964 A | 4/1973 | Nordvik | |
| 4,979,302 A | 12/1990 | Magnasco | |
| 5,813,295 A * | 9/1998 | Jensen, Jr. | E04D 15/003 254/21 |
| 6,318,213 B1 * | 11/2001 | Hendrix | E04D 15/003 30/169 |
| 8,256,809 B2 | 9/2012 | Couto | |
| 8,756,747 B2 | 6/2014 | Rolph | |
| 9,736,979 B1 * | 8/2017 | Millard | A01K 1/0114 |
| 9,775,272 B1 * | 10/2017 | Gilbert | B25G 1/06 |
| 2006/0200932 A1 | 9/2006 | Byrnes | |
| 2008/0185856 A1 | 8/2008 | DeWinter | |
| 2019/0330814 A1 * | 10/2019 | Yildiz | E02F 3/02 |
| 2020/0128793 A1 * | 4/2020 | Fredrickson | A01B 1/026 |

* cited by examiner

Primary Examiner — Stephen A Vu

(57) ABSTRACT

A manure scraping assembly includes a scraper that has a first portion forming an angle with a second portion. The scraper is positionable in a pushing position to push manure on the support surface. Conversely, the scraper is positionable in a pulling position to pull manure on the support surface. A handle is removably attached to the scraper and the handle can be gripped by a user thereby facilitating the scraper to be pushed or pulled. The handle angles upwardly at a substantially diagonal axis with respect to the first portion of the scraper when the scraper is positioned in the pushing position. Moreover, the handle angles upwardly at a substantially diagonal axis with respect to the second portion of the scraper when the scraper is positioned in the pulling position.

7 Claims, 6 Drawing Sheets

1

MANURE SCRAPING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to scraping devices and more particularly pertains to a new scraping device for either pushing or pulling manure toward a collection point. The device includes a scraper which has a first portion forming an angle with a second portion. A handle is coupled to the first portion for pushing manure toward a collection point when the first portion of the scraper rests on the ground. The scraper can be rotated to position the second portion of the scraper on the ground for pulling the manure toward the collection point.

(2) Description of Related Art Including Information Disclosed Under 37 CFR 1.97 and 1.98

The prior art relates to scraping devices including a snow shovel that has a curved panel and handle that can be attached to either side of the curved panel for pushing or pulling snow. The prior art discloses a scraping tool which includes an "S" shaped blade for either pushing or pulling granular material. The prior art discloses a scraper which includes a tube and a pair of panels each angling away from the tube in opposite directions for pushing or pulling material. The prior art also discloses a shoveling implement that includes a blade which has at least two concave faces.

BRIEF SUMMARY OF THE INVENTION

An embodiment of the disclosure meets the needs presented above by generally comprising a scraper that has a first portion forming an angle with a second portion. The scraper is positionable in a pushing position to push manure on the support surface. Conversely, the scraper is positionable in a pulling position to pull manure on the support surface. A handle is removably attached to the scraper and the handle can be gripped by a user thereby facilitating the scraper to be pushed or pulled. The handle angles upwardly at a substantially diagonal axis with respect to the first portion of the scraper when the scraper is positioned in the pushing position. Moreover, the handle angles upwardly at a substantially diagonal axis with respect to the second portion of the scraper when the scraper is positioned in the pulling position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
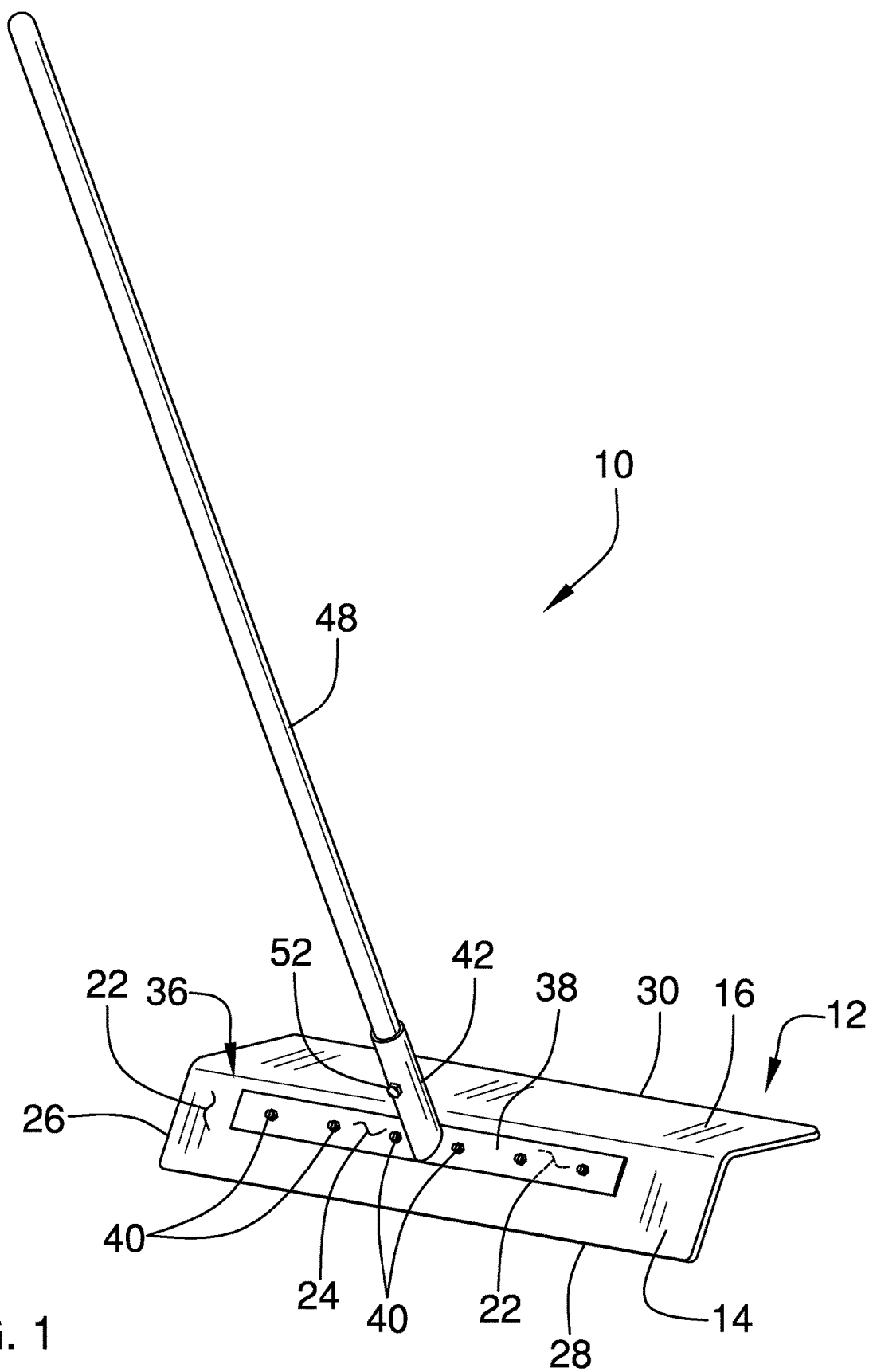
FIG. 1 is a back perspective view of a manure scraping assembly according to an embodiment of the disclosure.
Figure 2:
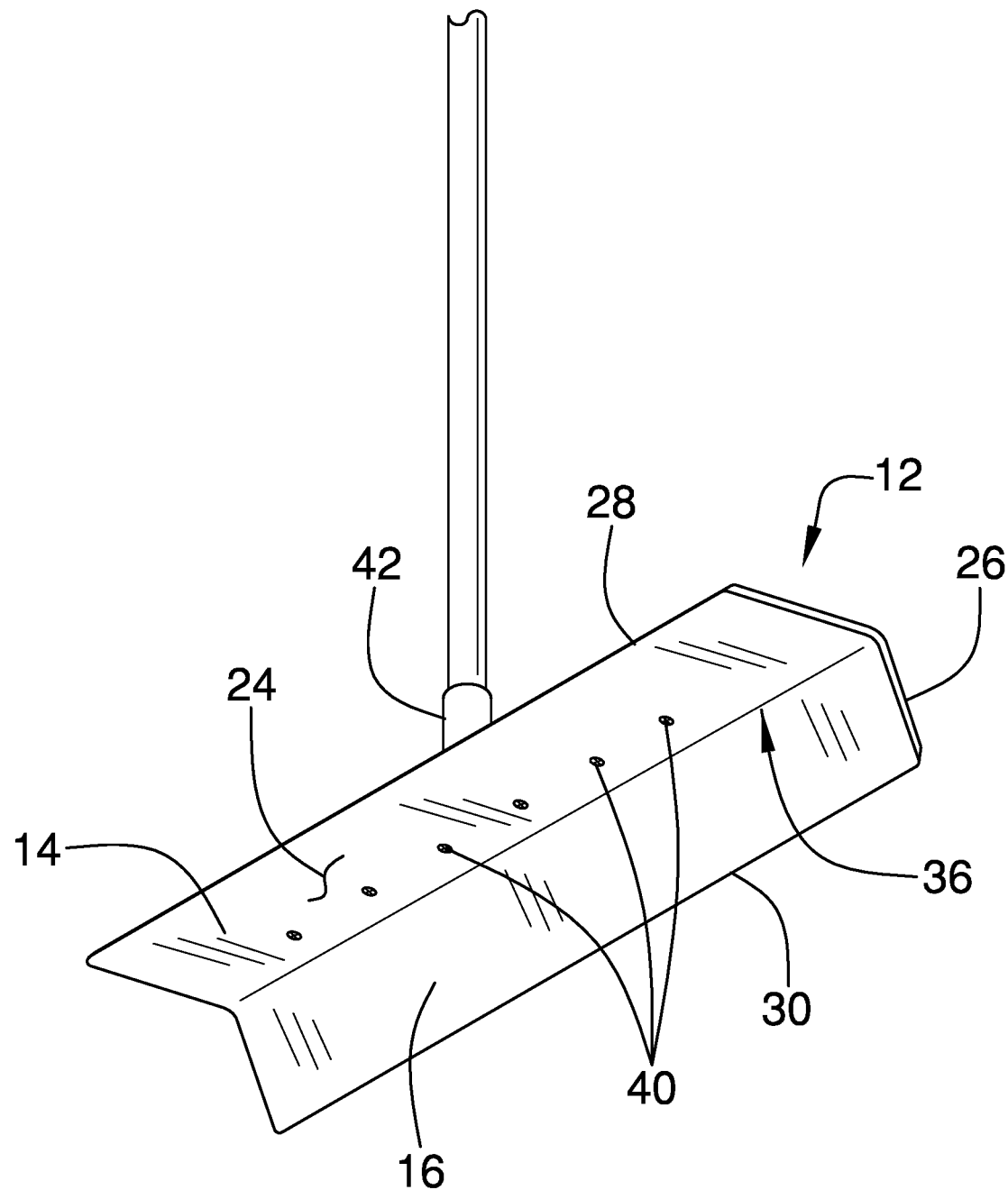
FIG. 2 is a front perspective view of an embodiment of the disclosure.
Figure 3:
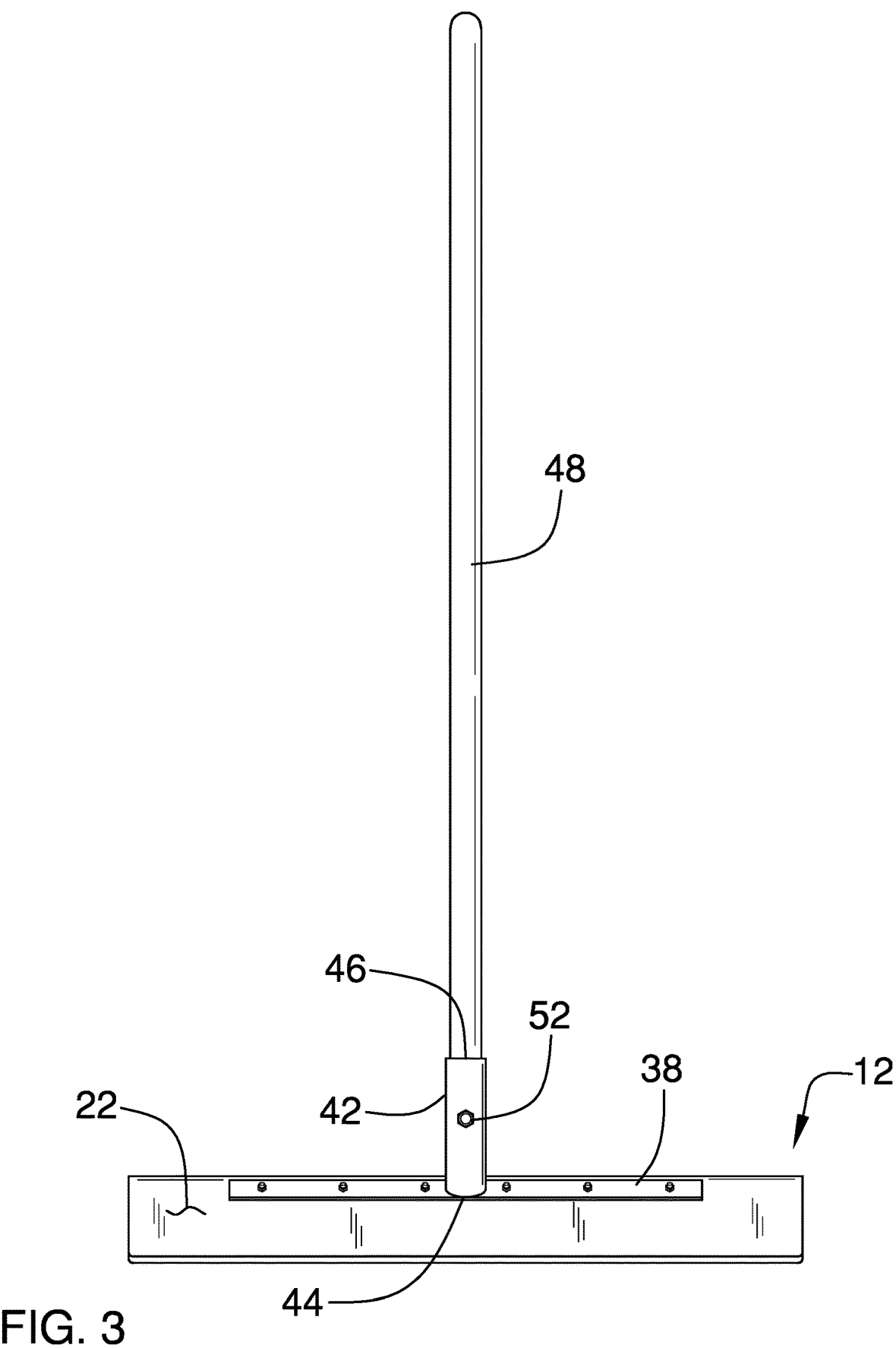
FIG. 3 is a top view of an embodiment of the disclosure.
Figure 4:
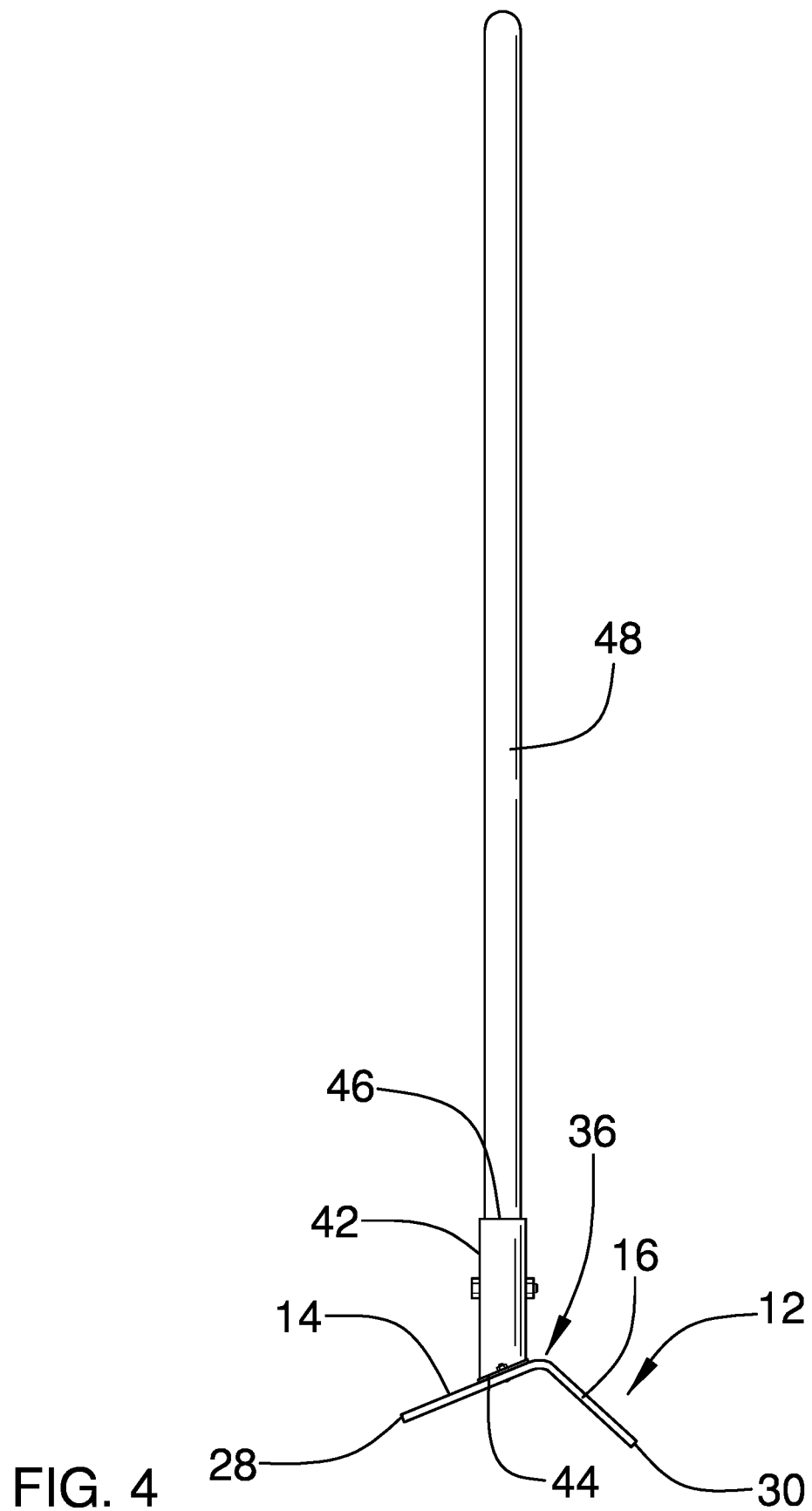
FIG. 4 is a right side view of an embodiment of the disclosure.

With reference now to the drawings, and in particular to FIGS. 1 through 6 thereof, a new scraping device embodying the principles and concepts of an embodiment of the disclosure and generally designated by the reference numeral 10 will be described.

As best illustrated in FIGS. 1 through 6, the manure scraping assembly 10 generally comprises a scraper 12 that has a first portion 14 forming an angle with a second portion 16. The scraper 12 is positionable in a pushing position having the first portion 14 abutting a support surface 18. In this way the scraper 12 can push manure 20 on the support surface 18. The support surface 18 may be a concrete pad, a floor of a feed lot or any other horizontal support surface upon which animal manure is collected. The scraper 12 is positionable in a pulling position having the second portion 16 abutting the support surface 18. In this way the scraper 12 can pull manure 20 on the support surface 18.

The scraper 12 has a first surface 22, a second surface 24 and a perimeter edge 26 extending therebetween, and the perimeter edge 26 has a top side 28, a bottom side 30, a first lateral side 32 and a second lateral side 34. The scraper 12 is elongated between the first lateral side 32 and the second lateral side 34, and the scraper 12 has a bend 36 extending between the first lateral side 32 and the second lateral side 34 to define the first portion 14 and the second portion 16. The first portion 14 is associated with the bottom side 30 of the perimeter edge 26 and the second portion 16 is associated with the top side 28 of the perimeter edge 26.

The bottom side 30 abuts the support surface 18 when the scraper 12 is positioned in the pushing position having the second portion 16 extending forwardly from the first portion 14 and having the second portion 16 being spaced from the support surface 18. The top side 28 abuts the support surface 18 when the scraper 12 is positioned in the pulling position having the first portion 14 extending forwardly from the second portion 16 and having the first portion 14 being spaced from the support surface 18. A panel 38 is coupled to the first portion 14 of the scraper 12 and the panel 38 is elongated to extend along a substantial length of the first portion 14. The panel 38 has a first surface 22 and a second surface 24, and the first surface 22 of the panel 38 is positioned against the first surface 22 of the scraper 12 that is associated with the first portion 14. Moreover, the panel 38 is positioned adjacent to the bend 36 having the panel 38 being oriented to extend along an axis that is oriented parallel with the bend 36.

A plurality of fasteners 40 is provided and each of the fasteners 40 extends through the second surface 24 of the scraper 12 associated with the first portion 14 and engages the panel 38 for attaching the panel 38 to the scraper 12. Each of the fasteners 40 may comprise a nut and bolt, a screw or other type of releasable, mechanical fastener. A sleeve 42 is coupled to and angles away from the panel 38 such that the sleeve 42 is substantially diagonally oriented with the first portion 14 of the scraper 12. The sleeve 42 has a coupled end 44 and a free end 46, and the coupled end 44 is coupled to the second surface 24 of the panel 38. The sleeve 42 is centrally positioned on the panel 38, the sleeve 42 is angled upwardly with respect to the bottom side 30 of the perimeter edge 26 of the panel 38 and the free end 46 is open.

A handle 48 is insertable into the sleeve 42 and the handle 48 can be gripped by a user 50 thereby facilitating the scraper 12 to be pushed or pulled. The handle 48 is insertable into the free end 46 of the sleeve 42 such that the handle 48 is oriented collinear with the sleeve 42. The handle 48 angles upwardly at a substantially diagonal axis with respect to the first portion 14 of the scraper 12 when the scraper 12 is positioned in the pushing position. Moreover, the handle 48 angles upwardly at a substantially diagonal axis with respect to the second portion 16 of the scraper 12 when the scraper 12 is positioned in the pulling position. A fastener 52 is extendable through the sleeve 42 and through the handle 48 when the handle 48 is inserted into the sleeve 42 for retaining the handle 48 in the sleeve 42. The fastener 52 in the sleeve 42 may be a nut and bolt, a screw or other type of releasable, mechanical fastener.

Figure 5:
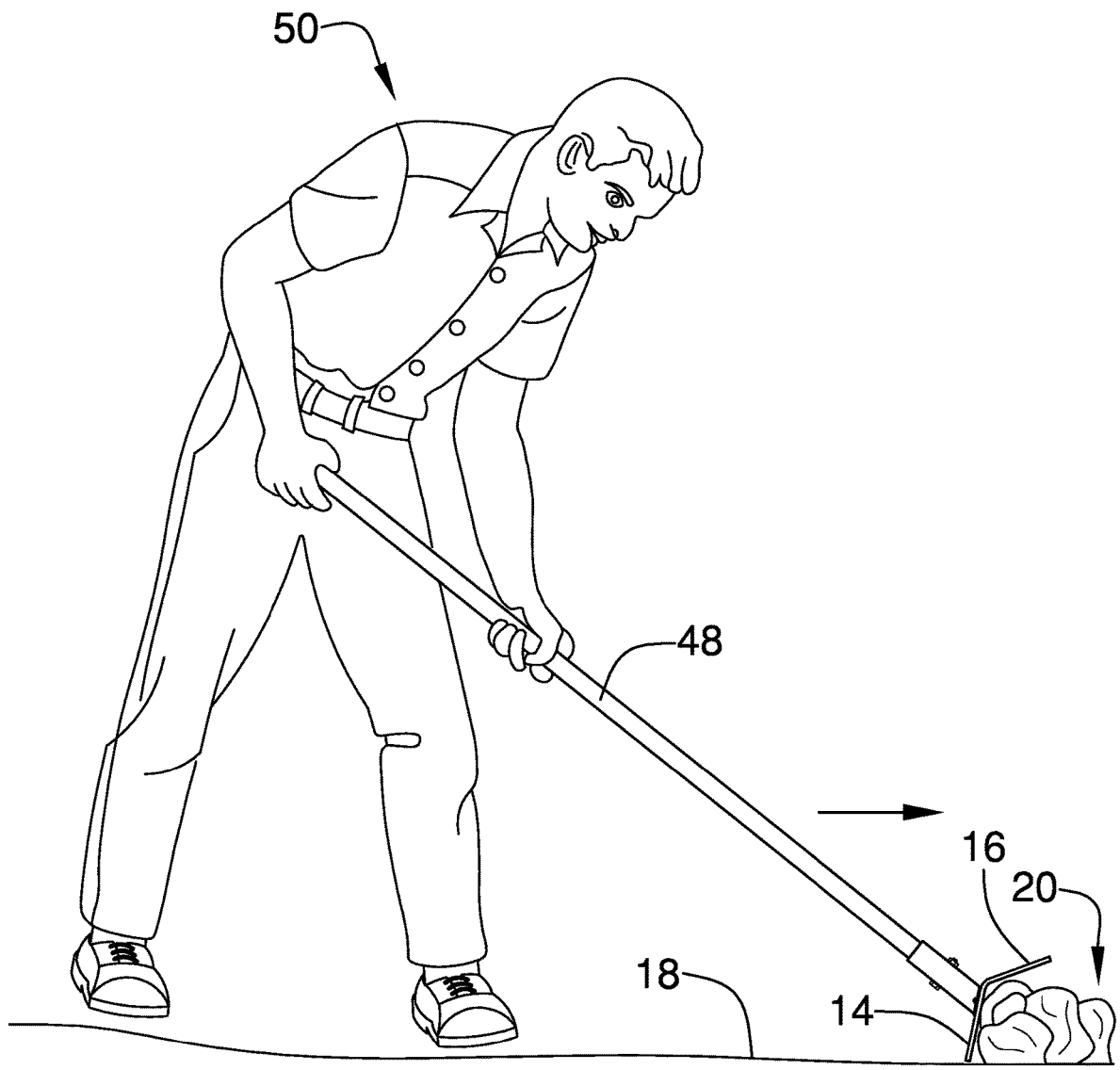
FIG. 5 is a perspective in-use view of an embodiment of the disclosure showing a scraper in a pushing position.
Figure 6:
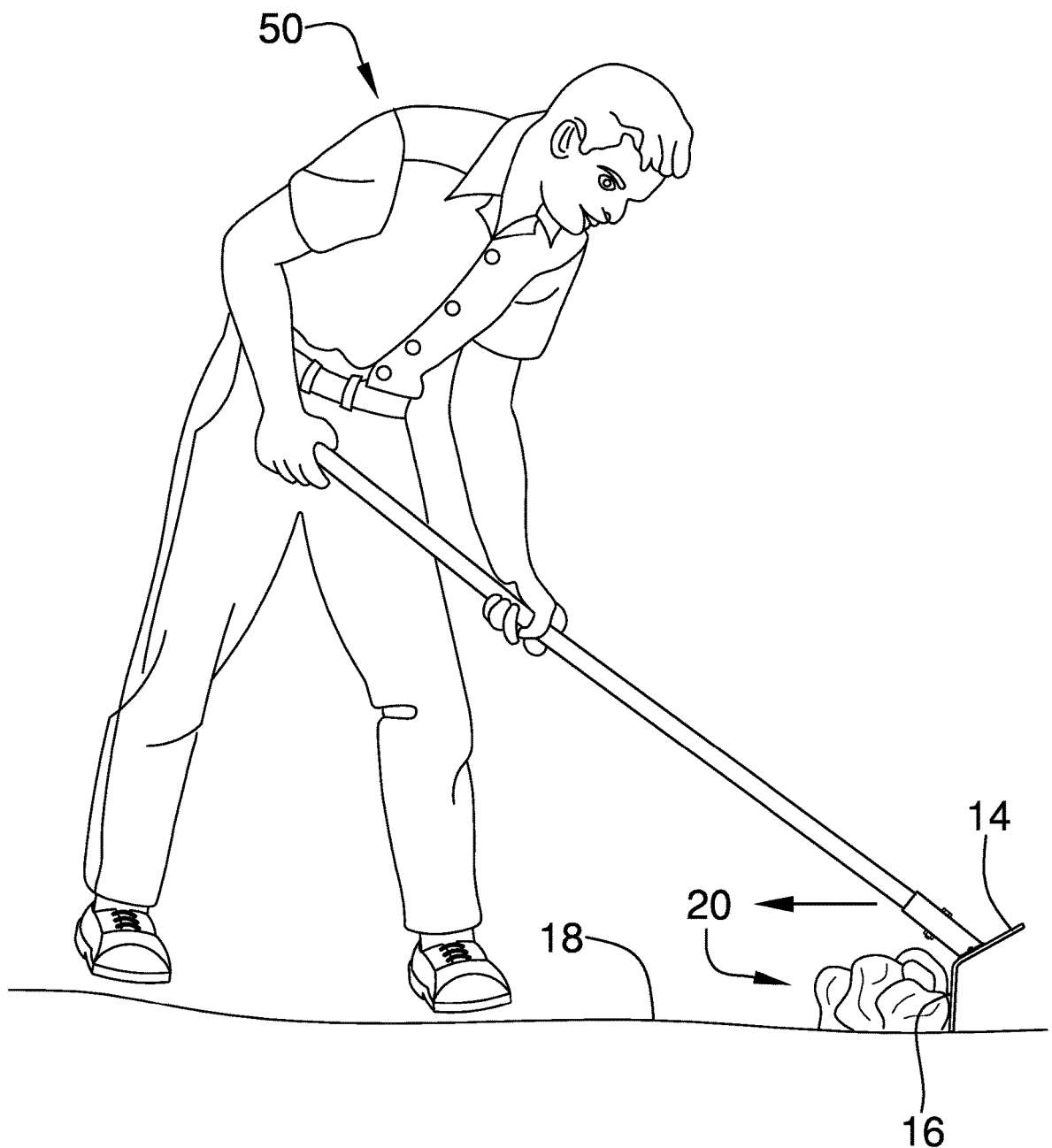
FIG. 6 is a perspective in-use view of an embodiment of the disclosure showing a scraper in a pulling position.

In use, as is most clearly shown in FIG. 5, the handle 48 is rotated to position the scraper 12 in the pushing position thereby facilitating the handle 48 to push against the first portion 14 of the scraper 12 when the handle 48 is pushed. Moreover, the first portion 14 of the scraper 12 is pushed downwardly against the support surface 18 while the scraper 12 is urged along the support surface 18. In this way the scraper 12 can push the manure 20 toward a collection point on the support surface 18. As is most clearly shown in FIG. 6, the handle 48 is rotated to position the scraper 12 in the pulling position thereby facilitating the handle 48 to pull against the first portion 14 of the scraper 12 when the handle 48 is pulled. In this way the handle 48 can be pressed downwardly while the second portion 16 of the scraper 12 is pulled along the support surface 18. Thus, the scraper 12 can pull the manure 20 toward the collection point on the support surface 18. In this way the scraper 12 can serve double duty for pushing or pulling the manure 20 rather than requiring two different tools to be employed for pushing and pulling the manure 20.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A manure scraping assembly for pushing or pulling manure for collecting the manure, said assembly comprising:
    a scraper having a first portion forming an angle with a second portion, said scraper being positionable in a pushing position having said first portion abutting a support surface wherein said scraper is configured to push manure on the support surface, said scraper being positionable in a pulling position having said second portion abutting the support surface wherein said scraper is configured to pull manure on the support surface;
    a panel being coupled to said first portion of said scraper, said panel being elongated to extend along a substantial length of said first portion;
    a sleeve being coupled to and angling away from said panel such that said sleeve is substantially diagonally oriented with said first portion of said scraper, said sleeve having a coupled end and a free end;
    a handle being insertable into said sleeve wherein said handle is configured to be gripped by a user thereby facilitating said scraper to be pushed or pulled, said handle being insertable into said free end of said sleeve such that said handle is oriented collinear with said sleeve, said handle angling upwardly at a substantially diagonal axis with respect to said first portion of said scraper when said scraper is positioned in said pushing position, said handle angling upwardly at a substantially diagonal axis with respect to said second portion of said scraper when said scraper is positioned in said pulling position; and
    a fastener being extendable through said sleeve and through said handle when said handle is inserted into said sleeve for retaining said handle in said sleeve.

2. The assembly according to claim 1, wherein said scraper has a first surface, a second surface and a perimeter edge extending therebetween, said perimeter edge having a top side, a bottom side, a first lateral side and a second lateral side, said scraper being elongated between said first lateral side and said second lateral side, said scraper having a bend extending between said first lateral side and said second lateral side to define said first portion and said second portion, said first portion being associated with said bottom side of said perimeter edge, said second portion being associated with said top side of said perimeter edge.

3. The assembly according to claim 2, wherein said bottom side abuts the support surface when said scraper is positioned in said pushing position having said second portion extending forwardly from said first portion and having said second portion being spaced from the support surface.

4. The assembly according to claim 2, wherein said top side abuts the support surface when said scraper is positioned in said pulling position having said first portion extending forwardly from said second portion and having said first portion being spaced from the support surface.

5. The assembly according to claim 2, wherein said panel has a first surface and a second surface, said first surface of said panel being positioned against said first surface of said scraper being associated with said first portion, said panel being positioned adjacent to said bend having said panel being oriented to extend along an axis being oriented parallel with said bend.

6. The assembly according to claim 5, wherein said coupled end of said sleeve is coupled to said second surface of said panel, said sleeve being centrally positioned on said panel, said sleeve being angled upwardly with respect to said bottom side of said perimeter edge of said panel, said free end being open.

7. A manure scraping assembly for pushing or pulling manure for collecting the manure, said assembly comprising:
- a scraper having a first portion forming an angle with a second portion, said scraper being positionable in a pushing position having said first portion abutting a support surface wherein said scraper is configured to push manure on the support surface, said scraper being positionable in a pulling position having said second portion abutting the support surface wherein said scraper is configured to pull manure on the support surface, said scraper having a first surface, a second surface and a perimeter edge extending therebetween, said perimeter edge having a top side, a bottom side, a first lateral side and a second lateral side, said scraper being elongated between said first lateral side and said second lateral side, said scraper having a bend extending between said first lateral side and said second lateral side to define said first portion and said second portion, said first portion being associated with said bottom side of said perimeter edge, said second portion being associated with said top side of said perimeter edge, said bottom side abutting the support surface when said scraper is positioned in said pushing position having said second portion extending forwardly from said first portion and having said second portion being spaced from the support surface, said top side abutting the support surface when said scraper is positioned in said pulling position having said first portion extending forwardly from said second portion and having said first portion being spaced from the support surface;
- a panel being coupled to said first portion of said scraper, said panel being elongated to extend along a substantial length of said first portion, said panel having a first surface and a second surface, said first surface of said panel being positioned against said first surface of said scraper being associated with said first portion, said panel being positioned adjacent to said bend having said panel being oriented to extend along an axis being oriented parallel with said bend;
- a plurality of fasteners, each of said fasteners extending through said second surface of said scraper associated with said first portion and engaging said panel for attaching said panel to said scraper;
- a sleeve being coupled to and angling away from said panel such that said sleeve is substantially diagonally oriented with said first portion of said scraper, said sleeve having a coupled end and a free end, said coupled end being coupled to said second surface of said panel, said sleeve being centrally positioned on said panel, said sleeve being angled upwardly with respect to said bottom side of said perimeter edge of said panel, said free end being open;
- a handle being insertable into said sleeve wherein said handle is configured to be gripped by a user thereby facilitating said scraper to be pushed or pulled, said handle being insertable into said free end of said sleeve such that said handle is oriented collinear with said sleeve, said handle angling upwardly at a substantially diagonal axis with respect to said first portion of said scraper when said scraper is positioned in said pushing position, said handle angling upwardly at a substantially diagonal axis with respect to said second portion of said scraper when said scraper is positioned in said pulling position; and
- a fastener being extendable through said sleeve and through said handle when said handle is inserted into said sleeve for retaining said handle in said sleeve.

* * * * *